(12) United States Patent
Aoyama

(10) Patent No.: US 11,002,379 B2
(45) Date of Patent: May 11, 2021

(54) MANUAL VALVE AND PNEUMATIC DEVICE

(71) Applicant: CKD CORPORATION, Komaki (JP)

(72) Inventor: Tatsuhito Aoyama, Kasugai (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 16/701,220

(22) Filed: Dec. 3, 2019

(65) Prior Publication Data
US 2020/0191299 A1 Jun. 18, 2020

(30) Foreign Application Priority Data
Dec. 12, 2018 (JP) .............................. JP2018-232799

(51) Int. Cl.
*F16K 35/10* (2006.01)

(52) U.S. Cl.
CPC ..................................... *F16K 35/10* (2013.01)

(58) Field of Classification Search
CPC ........ F16K 35/06; F16K 35/025; F16K 35/02; F16K 35/10; Y10T 70/5637
See application file for complete search history.

(56) References Cited

U.S. PATENT DOCUMENTS

| | | | | |
|---|---|---|---|---|
| 211,400 A * | 1/1879 | Harlin et al. | ........... | F16K 35/10 70/180 |
| 615,243 A * | 12/1898 | Bocquet | ................. | F16K 35/10 137/384 |
| 2,099,869 A * | 11/1937 | Stainbrook | ............. | F16K 35/10 70/180 |
| 2,530,899 A * | 11/1950 | Mueller | ................... | F16K 35/10 292/307 R |
| 2,748,794 A * | 6/1956 | Dodds | ..................... | F16K 35/10 137/385 |
| 3,960,168 A * | 6/1976 | Plympton | ............... | F16K 35/10 137/385 |
| 4,208,033 A * | 6/1980 | Kesterman | ............. | F16K 35/10 137/385 |
| 4,534,379 A * | 8/1985 | Burge | ..................... | F16K 35/10 137/385 |
| 5,427,135 A * | 6/1995 | Kieper | .................. | F16K 5/0605 137/385 |
| 5,806,555 A * | 9/1998 | Magno, Jr. | .............. | E05B 13/00 137/385 |

(Continued)

FOREIGN PATENT DOCUMENTS

JP 2016-011751 A 1/2016

*Primary Examiner* — Reinaldo Sanchez-Medina
*Assistant Examiner* — Nicole Gardner
(74) *Attorney, Agent, or Firm* — Oliff PLC

(57) ABSTRACT

A manual valve provided with a valve body and a handle includes a lock mechanism to which a lock is attachable. The lock mechanism includes a movable member provided with first and second plate portions, and a support rod pivotally supporting the movable member. The movable member includes a mating hole engageable with only the handle placed in a fully-closed position. The movable member is guided along a guide hole through which the support rod is inserted to move between a locking position where the mating hole is engaged with the handle to lock the handle and an unlocking position where the mating hole is not engaged with the handle to allow rotation of the handle.

16 Claims, 11 Drawing Sheets

(56) References Cited

U.S. PATENT DOCUMENTS

| | | | | |
|---|---|---|---|---|
| 6,152,161 | A * | 11/2000 | Yokota | F16K 35/10 137/38 |
| 6,994,106 | B1 * | 2/2006 | Hackley | E03B 9/06 137/382 |
| 7,219,685 | B1 * | 5/2007 | Espinoza | F16K 35/06 137/385 |
| 8,402,798 | B2 * | 3/2013 | Brojanac | F16K 35/10 70/19 |
| 9,958,087 | B1 * | 5/2018 | Kleppen | F16K 35/04 |
| 2001/0000850 | A1 * | 5/2001 | Nishimura | F16K 35/10 70/175 |
| 2006/0112742 | A1 * | 6/2006 | Strauss | F16K 35/10 70/177 |
| 2010/0319416 | A1 * | 12/2010 | Eller, Jr. | F16K 35/06 70/164 |
| 2015/0354723 | A1 | 12/2015 | Aoyama | |

* cited by examiner

12: ELECTROMAGNETIC VALVE

MANUAL VALVE AND PNEUMATIC DEVICE

CROSS-REFERENCE TO RELATED APPLICATIONS

This application is based upon and claims the benefit of priority from the prior Japanese Patent Application No. 2018-232799 filed on Dec. 12, 2018, the entire contents of which are incorporated herein by reference.

BACKGROUND

Technical Field

This disclosure relates to a manual valve (i.e., a manually-operated valve) and a pneumatic device.

Related Art

For instance, a pneumatic device is operated by air pressure controlled by on-off operations of an electromagnetic valve which is connected to an operation port of the pneumatic device. To prevent the pneumatic device from operating during maintenance, a manual valve is arranged in a pipe connecting the pneumatic device and the electromagnetic valve (see for example Japanese unexamined patent application publication No. 2016-11751).

SUMMARY

Technical Problems

However, the conventional arts have the following problems. Specifically, the manual valve placed between the pneumatic device and the electromagnetic valve is not used directly for control of air pressure but is used as a safety device for preventing malfunction of the pneumatic device. Further, the air pressure is relatively low. Accordingly, a small valve has been used as the manual valve. When such a manual valve is equipped with a lock mechanism, the entire valve size of the manual valve is apt to become large. The conventional manual valve placed between the pneumatic device and the electromagnetic valve is therefore not provided with a lock mechanism. However, a manual valve including a lock mechanism has been strongly demanded by frontline workers who operate pneumatic devices.

The present disclosure has been made to address the above problems and has a purpose to provide a manual valve provided with a lock mechanism but designed small in size, and a pneumatic device.

Means of Solving the Problems

To achieve the above problems, one aspect of the present disclosure provides a manual valve comprising: a valve body; a handle rotatably attached to the valve body; and a lock mechanism configured to allow attachment of a lock to restrict the handle from rotating from a predetermined position, wherein the lock mechanism comprises: a movable member having a bent-plate shape and including a first plate portion and a second plate portion continuous with the first plate portion; and a support rod attached to the valve body to pivotally support the movable member, the first plate portion includes an engagement part configured to engage with the handle to restrict rotation of the handle when the handle is placed in the predetermined position, whereas configured not to engage the handle to permit the rotation of the handle when the handle is placed in a position other than the predetermined position, and the second plate portion includes: a guide hole through which the support rod is slidably inserted to guide the movable member between a locking position in which the engagement part is in engagement with the handle and an unlocking position in which the engagement part is out of engagement with the handle; and a lock hole in which the lock is attachable.

In the manual valve configured as above, the bent-plate shaped movable member is provided with the engagement part and the guide hole, and the movable member is pivotally supported by the support rod inserted through the guide hole. This manual valve including the lock mechanism is nearly equal in entire valve size to a manual valve including no lock mechanism. The lock mechanism engages the handle only when the handle is disposed in a predetermined position to hold the handle from further rotating from the predetermined position. In this case, when a lock is attached to the lock hole, the lock mechanism keeps a locking state for restricting the rotation of the handle. Thus, the manual valve configured as above can be provided with the lock mechanism but designed small in valve size.

The present disclosure can achieve a manual valve provided with a lock mechanism but designed small in valve size, and a pneumatic device.

DETAILED DESCRIPTION OF THE EXEMPLARY EMBODIMENTS

A detailed description of an embodiment of a manual valve and a pneumatic device according to the present disclosure will now be given referring to the accompanying drawings.

(Configuration of the Manual Valve)

Figure 1:
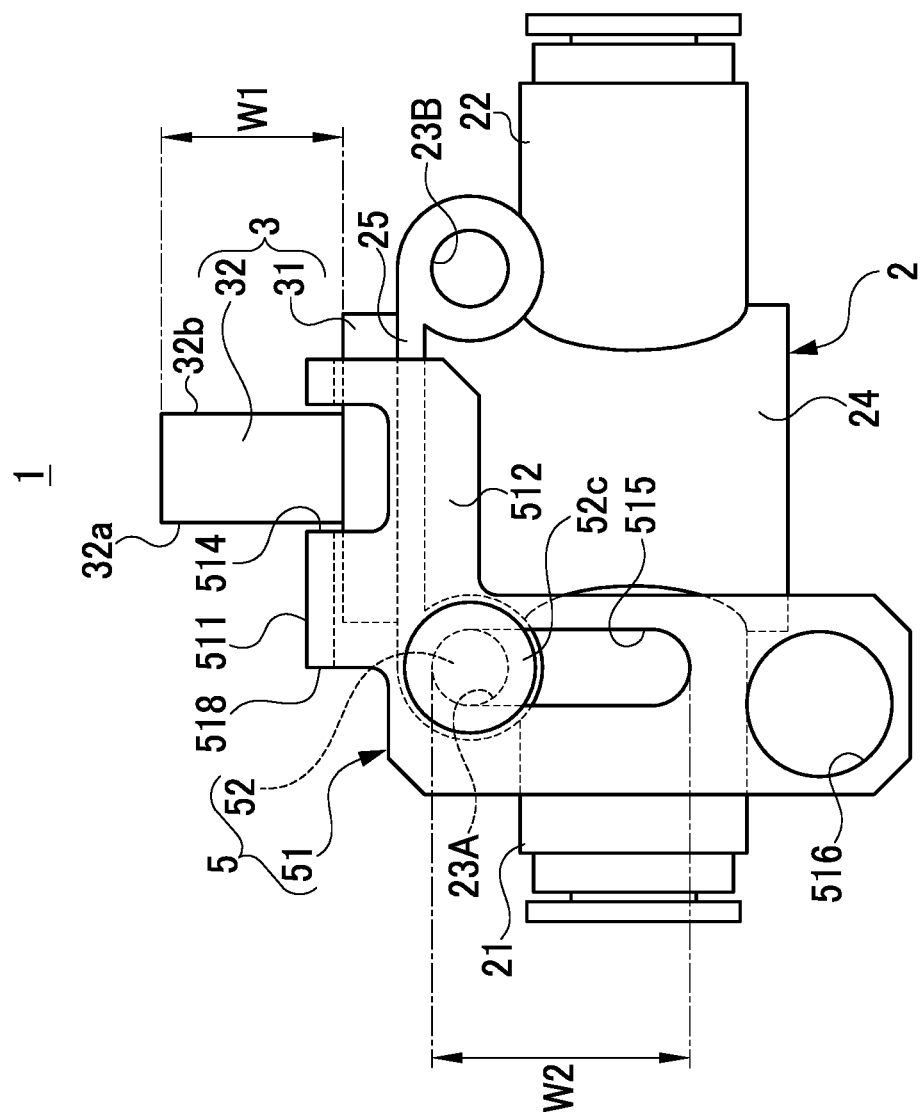
FIG. 1 is a side view of a manual valve in an embodiment of the present disclosure, showing a lock mechanism located in a locking position.
Figure 2:
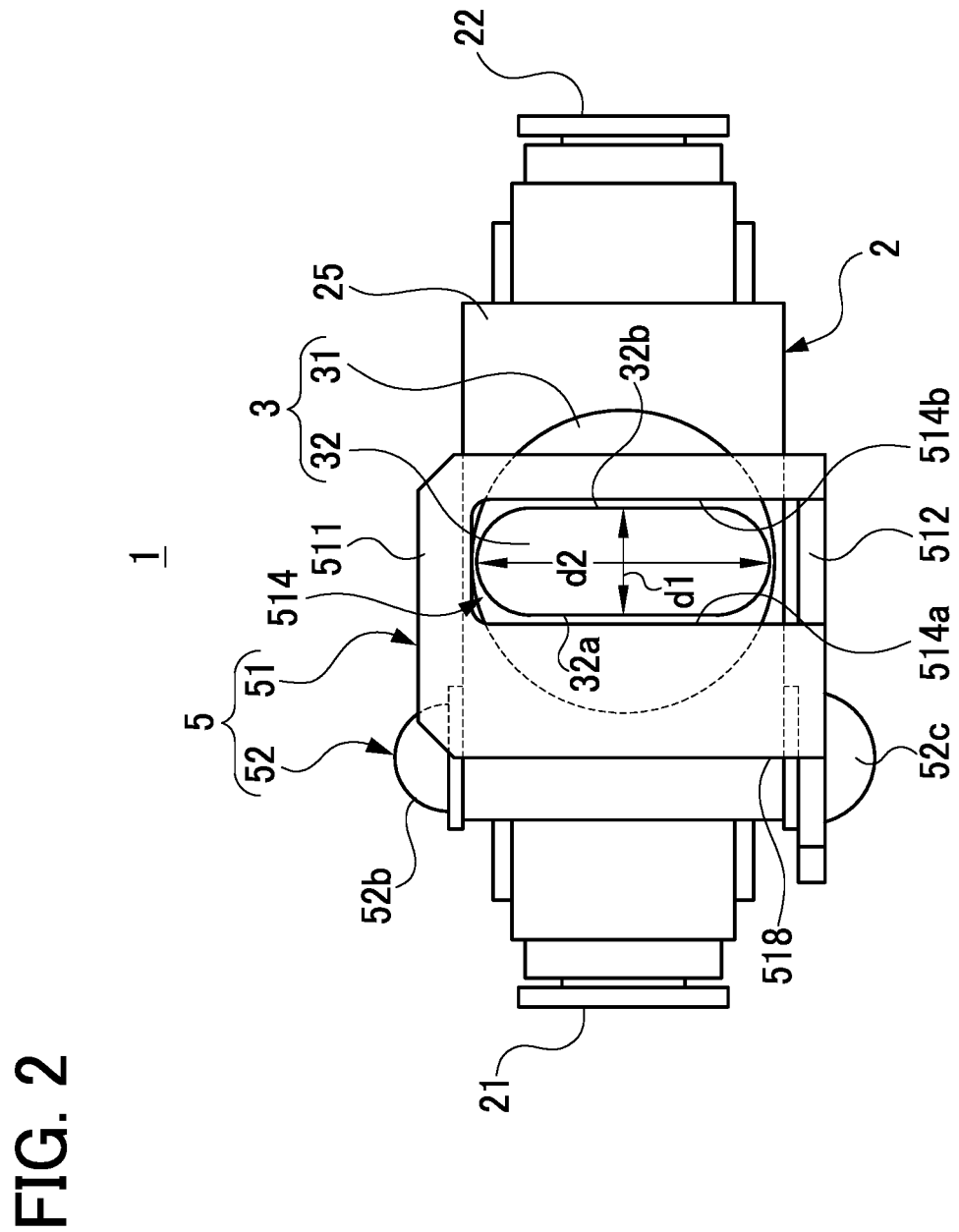
FIG. 2 is a top view of the manual valve shown in FIG. 1.
Figure 3:
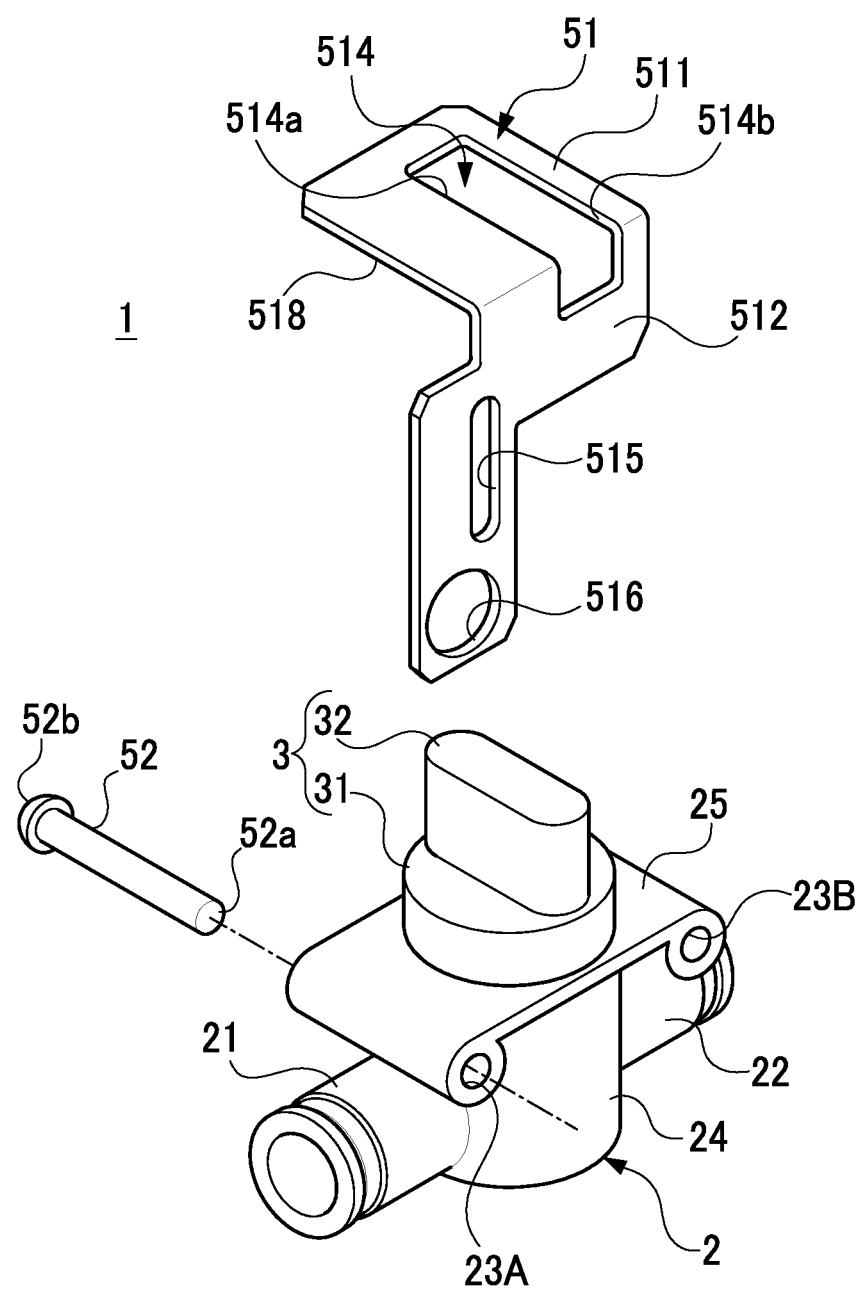
FIG. 3 is an exploded view of the lock mechanism.
Figure 4:
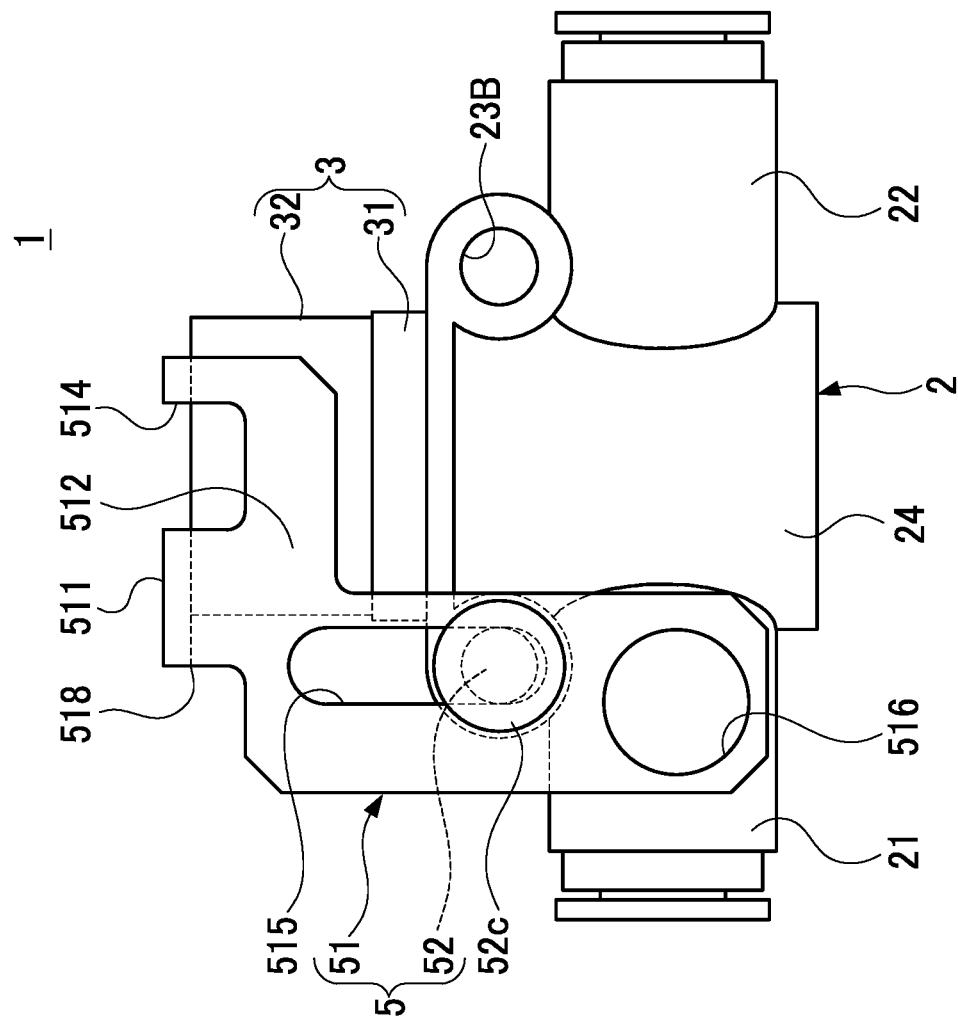
FIG. 4 is a side view of the manual valve, showing the lock mechanism located in an unlocking position.
Figure 5:
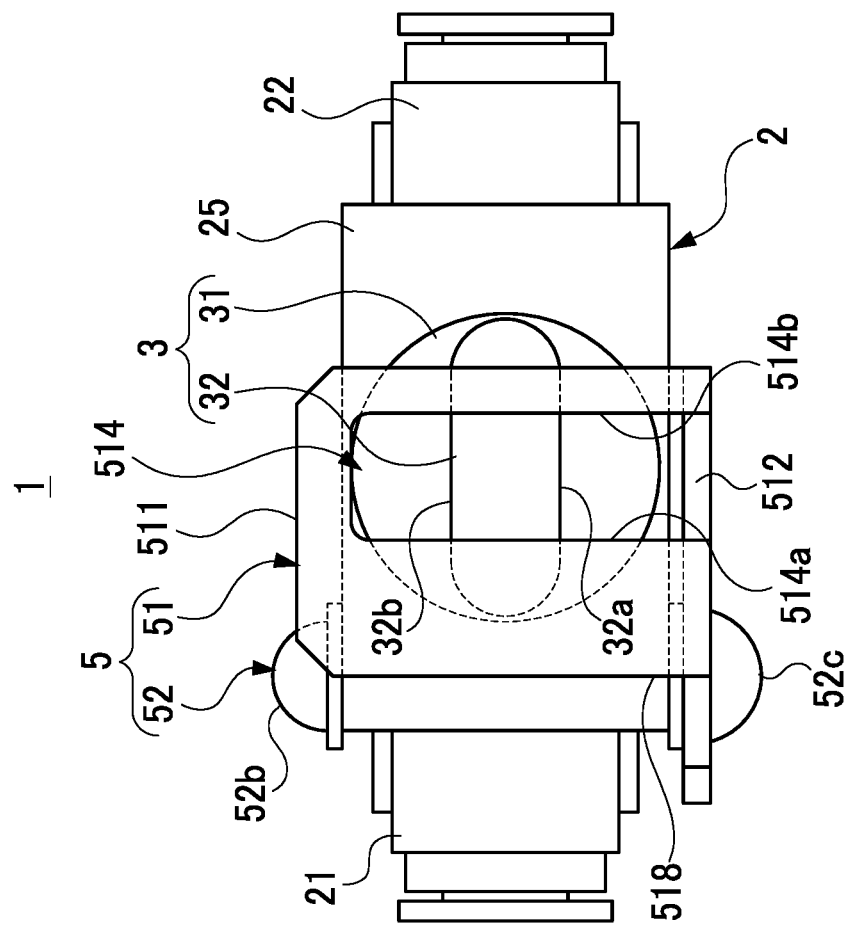
FIG. 5 is a top view of the manual valve shown in FIG. 4.
Figure 6:
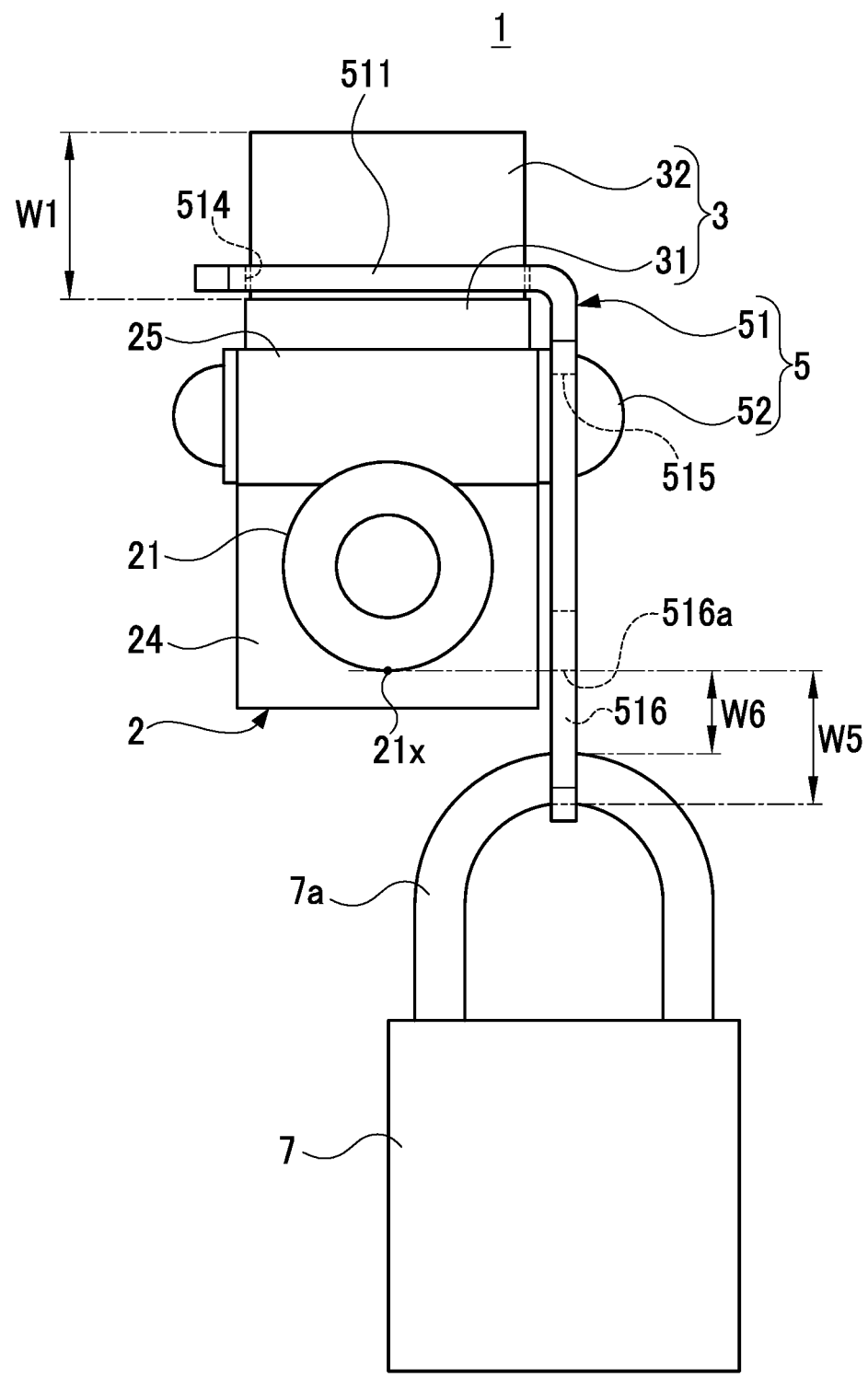
FIG. 6 is a view showing the lock mechanism to which a lock is attached.
Figure 7:
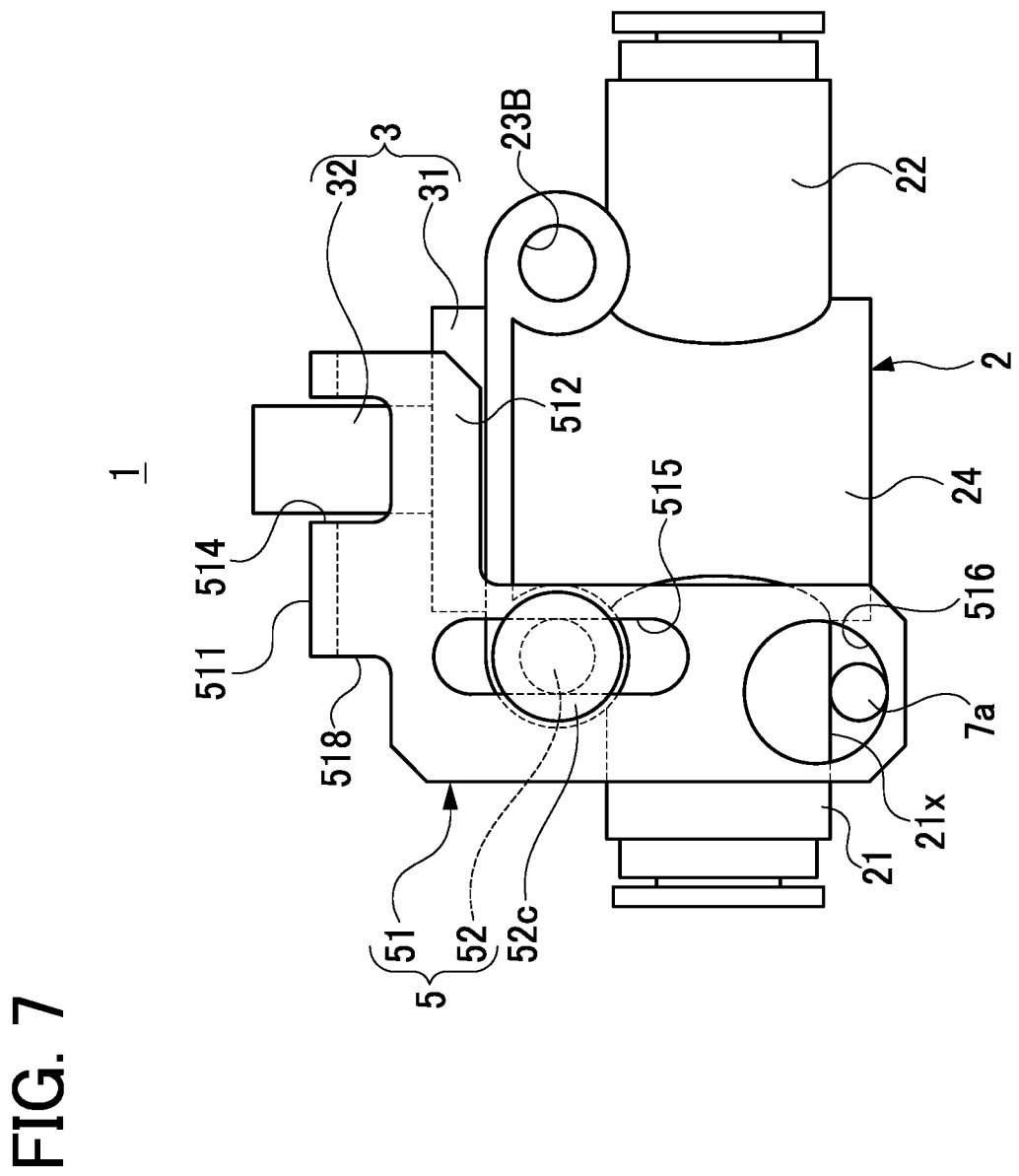
FIG. 7 is a side view of the manual valve for explanation of a locking operation.
Figure 8:
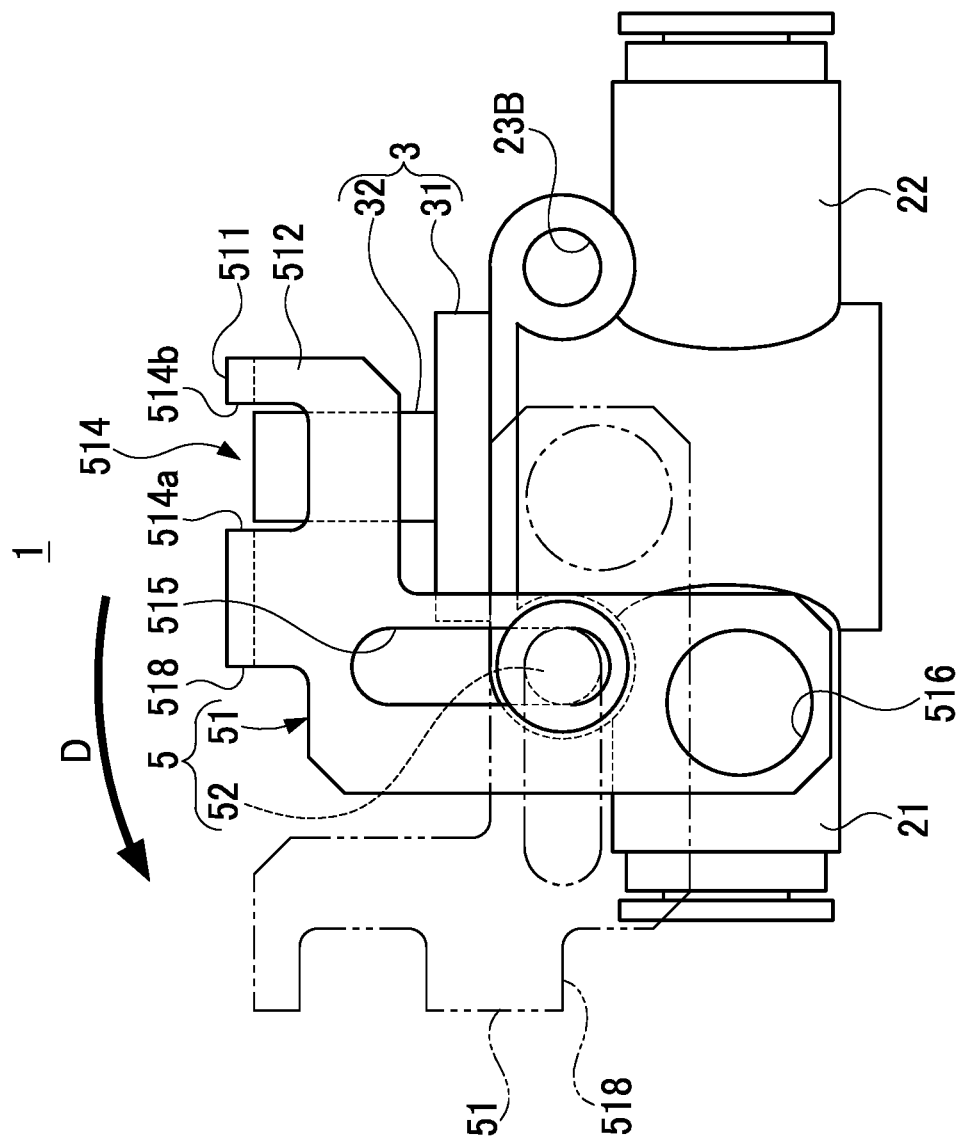
FIG. 8 is a side view of the manual valve for explanation of a rotating operation of the lock mechanism.
Figure 9:
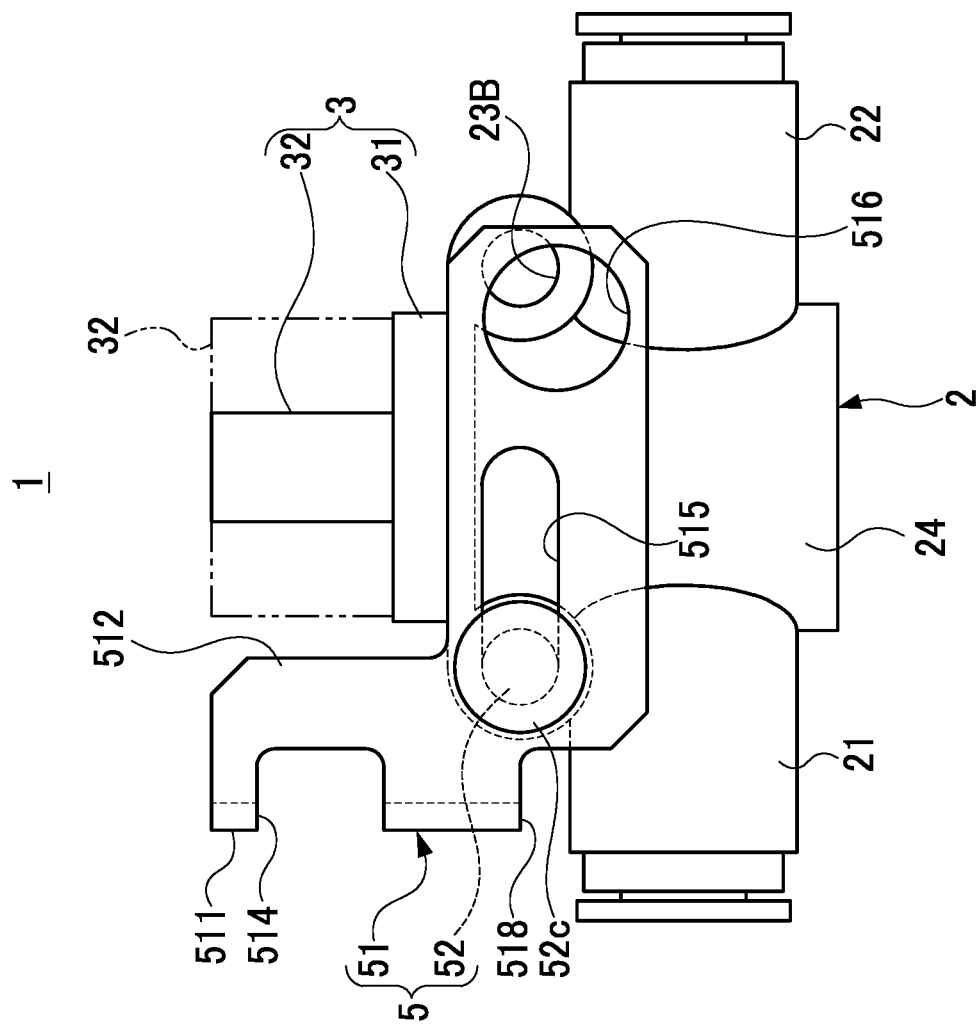
FIG. 9 is a side view of the manual valve, in which the lock mechanism is located in a holding position.

The configuration of a manual valve 1 in the present embodiment will be described below with reference to accompanying drawings. FIG. 1 is a side view of the manual valve 1 in the present embodiment, in which a lock mechanism 5 is placed in a locking position. FIG. 2 is a top view of the manual valve 1 shown in FIG. 1. FIG. 3 is an exploded view of the lock mechanism 5. FIG. 4 is a side view of the manual valve 1, in which the lock mechanism 5 is placed in an unlocking position. FIG. 5 is a top view of the manual valve 1 shown in FIG. 4. FIG. 6 is a view of the lock mechanism 5 to which a lock 7 is attached. FIG. 7 is a side view of the manual valve 1 for explanation of a locking operation. FIG. 8 is a side view of the manual valve 1 for explanation of a rotating operation of the lock mechanism 5. FIG. 9 is a side view of the manual valve 1 in which the lock mechanism 5 is placed in a holding position.

The manual valve 1 shown in FIG. 1 is for example a small valve to be placed in a flow path connecting a pneumatic device which is operated by air pressure and a control valve which controls the air pressure to be supplied to the pneumatic device. The manual valve 1 is used as a safety device configured to shut off the flow path between the control valve and the pneumatic device during maintenance of the pneumatic device to prevent malfunction of the pneumatic device.

In the manual valve 1, as shown in FIG. 6, a handle 3 is rotatably held in a valve body 2. The manual valve 1 is provided with a lock mechanism 5 configured to restrict the rotation of the handle 3 placed in a predetermined position when a lock 7 is attached to the lock mechanism 5.

As shown in FIG. 1, the valve body 2 includes a cylindrical valve body 24, an inlet part 21 for inflow of a fluid, and an outlet part 22 for outflow of the fluid. The inlet part 21 and the outlet part 22 are provided at opposite sides of the valve body 24. The valve body 24 contains a valve unit (not illustrated) in which a valve element contacts with or separates from a valve seat to control a fluid allowed to flow from the inlet part 21 to the outlet part 22. The unillustrated valve unit is coupled to the handle 3 and configured to receive drive power according to the rotation of the handle 3 to perform an opening/closing operation. The valve body 2 is made integral with a mounting part 25 to be used for attachment of the manual valve 1 to another member or device.

The mounting part 25 is provided with a first mounting hole 23A and a second mounting hole 23B as shown in FIG. 3 such that the first mounting hole 23A and the second mounting hole 23B are located symmetrically relative to the handle 3. As shown in FIG. 1, the first mounting hole 23A is provided in a position corresponding to a portion of the inlet part 21 continuous with the valve body 24. The second mounting hole 23B is provided in a position corresponding to a portion of the outlet part 22 continuous with the valve body 24. The first mounting hole 23A and the second mounting hole 23B extend penetrating through the mounting part 25 in a direction perpendicular to the common axis of the inlet part 21 and the outlet part 22. For instance, the manual valve 1 is attached to another member or device (not shown) in such a way that a fixing screw not shown is inserted through the first mounting hole 23A or the second mounting hole 23B (in the present embodiment, through the second mounting hole 23B) and further tightened to the relevant member or device.

The handle 3 includes a cylindrical body part 31 and a knob 32 provided thereon as shown in FIG. 1. Specifically, the knob 32 is made integral with the body part 31 so as to protrude from the body part 31 to an opposite side to the valve body 2 along an axis of the handle 3, i.e., a central axis thereof extending in the vertical direction in FIG. 1.

The knob 32 has an elongated shape seen from above the distal end (i.e., the top) of the handle 3 as shown in FIG. 2. This knob 32 includes a pair of engagement faces 32a and 32b extending in parallel relative to the axis of the handle 3, i.e., the diametrical axis of the handle 3. The knob 32 is designed such that the width d1 between the engagement faces 32a and 32b is shorter than the length d2 in a direction (i.e., in a vertical direction in FIG. 2) perpendicular to a width direction of the knob 32 (i.e., in a lateral direction in FIG. 2).

When the handle 3 is disposed in a fully-closed position where the handle 3 fully closes the manual valve 1, as shown in FIG. 2, the knob 32 is oriented such that the pair of engagement faces 32a and 32b are placed along the direction (the vertical direction in FIG. 2) perpendicular to the axial direction (the lateral direction in FIG. 2) of the inlet part 21 and the outlet part 22, and the planar shape of the knob 33 seen from above the distal end of the handle 3 is an elongated shape which is long in the vertical direction in FIG. 2. In contrast, when the handle 3 is disposed in a fully-open position where the handle 3 fully opens the manual valve 1, as shown in FIG. 5, the knob 32 is oriented such that the pair of engagement faces 32a and 32b are placed along the axial direction of the inlet part 21 and the outlet part 22 (the lateral direction in FIG. 5), and the planar shape of the knob 33 seen from above the distal end of the handle 3 is an elongated shape which is long in the lateral direction in FIG. 5. Thus, the shape (orientation) of the knob 32 of the handle 3 seen from above its distal end looks different between when the handle 3 is in the fully-closed position and when the handle 3 is in the fully-open position.

As shown in FIGS. 1 and 2, the lock mechanism 5 includes a movable member 51 and a support rod 52 and configured to engage with the handle 3 disposed in the fully-closed position to inhibit the rotation of the handle 3. The movable member 51 is held to be slidable and rotatable with respect to the valve body 2 through the support rod 52 attached to the valve body 2 as shown in FIGS. 1, 8, and 9.

The movable member 51 is made of a plate material that has been subjected to punching into a predetermined shape with holes and then bending into an L-shape as shown in FIG. 3. This movable member 51 includes a first plate portion 511 and a second plate portion 512 continuous with the first plate portion 511. The first plate portion 511 is provided with a mating hole 514. This mating hole 514 is one example of an engagement part. The second plate portion 512 is provided with a guide hole 515 and a lock hole 516.

The mating hole 514 has such a shape as to engage with the knob 32 only when the handle 3 is disposed in the fully-closed position as shown in FIG. 2. The fully-closed position is one example of a predetermined position.

Specifically, the mating hole 514 is rectangular in shape corresponding to the vertically-long planar shape of the knob 32 oriented when the handle 3 is located in the fully-closed position. The mating hole 514 is designed with a short-side width slightly larger than the width d1 between the engagement faces 32a and 32b of the knob 32 so that a pair of inner edges 514a and 514b of the mating hole 514 are positioned close to the engagement faces 32a and 32b respectively. Thus, as shown in FIGS. 4 and 5, when the handle 3 is in the fully-open position, the knob 32 is in the way of the first plate portion 511 of the movable member 51, thereby disabling the mating hole 514 from engaging with the knob 32.

In the second plate portion 512, as shown in FIG. 1, the guide hole 515 is formed at a position corresponding to the first mounting hole 23A when the movable member 51 is disposed in the locking position. The guide hole 515 is designed to extend straight from the position corresponding to the first mounting hole 23A toward an opposite side to the first plate portion 511 in order to guide the movable member 51 placed in the locking position along the axial direction of the handle 3. The guide hole 515 has a width almost equal to the rod diameter of the support rod 52 to allow the support rod 52 to be slidably inserted therein.

The support rod 52 is for example a rivet as shown in FIG. 3. This support rod 52 is attached to the valve body 2 in such a way as to pass through the first mounting hole 23A of the valve body 2 and the guide hole 515 of the movable member 51 until a head 52b of the support rod 52 abuts against the mounting part 25 of the valve body 2, and a distal end portion 52a of the support rod 52 protruding from the guide hole 515 is riveted. Thus, the second plate portion 512 of the movable member 51 is held between the mounting part 25 of the valve body 2 and a riveted portion 52c of the support rod 52 as shown in FIG. 2, so that the movable member 51 is movably held by the valve body 2 through the support rod 52.

As shown in FIG. 1, the length W2 of the guide hole 515 in a longitudinal direction is set longer than the height W1 of the knob 32 in the axial direction. Accordingly, the movable member 51 is allowed to slide along the guide hole 515 from the locking position where the mating hole 514 is engaged with the knob 32 to inhibit the rotation of the handle 3 as shown in FIG. 1 to the unlocking position where the mating hole 514 is disengaged from the knob 32 to enable the rotation of the handle 3 as shown in FIG. 8.

The movable member 51 is pivotally supported by the support rod 52 as shown in FIGS. 1 and 2. Therefore, as shown in FIG. 8, the movable member 51 can be rotated from the unlocking position about the support rod 52 in a direction D in FIG. 8.

Herein, the moving distance of the movable member 51 from the locking position to the unlocking position is determined by the length W2 of the guide hole 51. The length W2 of the guide hole 515 is set so that the inner edge 514a of the mating hole 514 located close to the support rod 52 contacts with the knob 32 when the movable member 51 placed at the unlocking position is rotated about the support rod 52 in a reverse direction to the direction D in FIG. 8. This prevents the movable member 51 from rotating from the unlocking position in the reverse direction to the direction D to a position where the lock hole 516 is exposed above the inlet part 21 of the valve body 2.

Furthermore, as shown in FIG. 9, the movable member 51 with the mating hole 514 being outside an extended line (a two-dot chain line) of the knob 32 can be slid along the guide hole 515. Herein, the movable member 51 is provided with a cut-out portion 518 which is made by cutting out a part of the first plate portion 511 near the guide hole 515. Thus, the movable member 51 can be slid to right and left, i.e., in the lateral direction in FIG. 9, by a distance corresponding to the length W2 of the guide hole 515 so that the first plate portion 511 does not touch the inlet part 21. Thus, the holding position at which the movable member 51 is held in the unlocking position can be easily adjusted.

The lock hole 516 is provided in a position opposite the first plate portion 511 relative to the guide hole 515 as shown in FIG. 1. Specifically, the lock hole 516 is located in a position such that the lock hole 516 is exposed outside the valve body 2 without overlapping the valve body 24 and the inlet part 21 when the movable member 51 is placed in the locking position, whereas the lock hole 516 is not exposed outside the valve body 2 by overlapping the valve body 24 or the inlet part 21 when the movable member 51 is disposed in a position other than the locking position, that is, when the movable member 51 is placed in the unlocking position shown in FIG. 8, the holding position shown in FIG. 9, and other places.

Therefore, only when the movable member 51 is placed in the locking position, the lock mechanism 5 allows insertion of a connecting part 7a of the lock 7 into the lock hole 516 for attachment of the lock 7 to the movable member 51 as shown in FIG. 6. The lock 7 may be a lock with a shackle as shown in FIG. 6, a cable-type lock, or another type lock.

As shown in FIG. 6, the lock hole 516 is provided so that its inner periphery 516a located close to the first plate portion 511 is positioned to come into line with a lower end 21x of the inlet part 21 in the figure when the movable member 51 is placed in the locking position. The lock hole 516 is designed with the diameter W5 equal to or smaller than the height W1 of the knob 32 in the axial direction so that the distance W6 from the inner periphery 516a to the connecting part 7a of the lock 7 becomes smaller than the height W1 of the knob 32 in the axial direction.

Thus, the connecting part 7a abuts against the lower end 21x of the inlet part 21 as shown in FIG. 7 before the mating hole 514 is disengaged from the knob 32. This disables further sliding of the movable member 51 upward in FIG. 7. In other words, the lock mechanism 5 is held in the locking position while the lock 7 is attached to the movable member 51.

(Operations of the Lock Mechanism)

The operations of the lock mechanism 5 will be described below. In the lock mechanism 5, as shown in FIG. 6, while the mating hole 514 of the movable member 51 is engaged with the knob 32 of the handle 3, the lock 7 is attached to the lock hole 516. The manual valve 1 is thus locked with the handle 3 inhibited from rotating from the fully-closed position. For unlocking the manual valve 1, a worker first removes the lock 7 from the lock hole 516.

When the worker then slides the movable member 51 along the guide hole 515 from the locking position shown in FIG. 1 to the unlocking position shown in FIG. 8, the mating hole 514 is disengaged from the knob 32. Successively, the worker rotates the movable member 51 in the direction D from the unlocking position about the support rod 52 as shown in FIG. 8, so that the mating hole 514 comes out of the extended line of the knob 32. Further, the worker moves the movable member 51 along the guide hole 515 to for example the holding position shown in FIG. 9. In other words, the worker arbitrarily adjusts the holding position of the movable member 51 within the range of the guide hole 515. At that time, the handle 3 is not covered by the movable member 51 and thus the worker can rotate the handle 3 by pinching the knob 32 from the fully-closed position to the fully-open position.

In the lock mechanism 5, while the movable member 51 is moved from the unlocking position shown in FIG. 8 to the holding position shown in FIG. 9, the lock hole 516 overlaps the valve body 24 or the inlet part 21 of the manual valve 1 and thus the lock hole 516 is not exposed outside the valve body 2. Accordingly, when the handle 3 is disposed in a position other than the fully-closed position, the worker is not permitted to attach the lock 7 to the movable member 51 to restrict movement of the movable member 51.

Herein, when the handle 3 is disposed in the fully-open position as shown in FIGS. 4 and 5, even if the worker moves the movable member 51 to the unlocking position, the plate portion 511 comes into contact with the knob 32 and thus the mating hole 514 is not allowed to engage with the knob 32. Further, the lock hole 516 overlaps the inlet part 21 without being exposed outside the valve body 2. Accordingly, while the handle 3 is in the fully-open position, the worker is not permitted to attach the lock 7 to the lock mechanism 5 to lock the handle 3.

The locking procedure only has to be performed in reverse order to the foregoing unlocking procedure.

While the lock 7 is attached to the movable member 51 placed in the locking position as shown in FIG. 6, when the worker lifts up the movable member 51 in the axial direction of the handle 3, the connecting part 7a of the lock 7 comes into contact with the inlet part 21 as shown in FIG. 7 before the mating hole 514 is disengaged from the knob 32. Accordingly, in the manual valve 1, the movable member 51 cannot be moved from the locking position to the unlocking position unless the lock 7 is detached. Thus, the handle 3 is held in the locked state.

The manual valve 1 in the present embodiment, as described above, includes the valve body 2 and the handle 3 rotatably attached to the valve body 2. This manual valve 1 further includes the lock mechanism 5 configured to allow attachment of the lock 7 to restrict the rotation of the handle 3 from the fully-closed position. The lock mechanism 5 includes the movable member 51 having a bent-plate shape and including the first plate portion 511 and the second plate portion 512 continuous with the first plate portion 511, and the support rod 52 attached to the valve body 2 to pivotally support the movable member 51. The first plate portion 511 is provided with the mating hole 514 configured to engage with the handle 3 to restrict the rotation of the handle 3 when the handle 3 is placed in the fully-closed position, whereas configured not to engage with the handle 3 to allow the rotation of the handle 3 when the handle 3 is placed in a position other than the fully-closed position. The second plate portion 512 is provided with the guide hole 515 through which the support rod 52 is slidably inserted to guide the movable member 51 between the locking position where the mating hole 514 engages with the handle 3 and the unlocking position where the mating hole 514 does not engage with the handle 3, and the lock hole 516 in which the lock 7 can be attached.

In the manual valve 1 configured as above, the bent-plate shaped movable member 51 is provided with the mating hole 514 and the guide hole 515 and pivotally supported by the support rod 52 inserted through the guide hole 515. This manual valve 1 provided with the lock mechanism 5 is nearly equal in entire valve size to a manual valve including no lock mechanism. Only when the handle 3 is disposed in the fully-closed position, the lock mechanism 5 engages with the handle 3 to restrict the rotation of the handle 3 from the fully-closed position. In this case, when the lock 7 is attached to the lock hole 516, the lock mechanism 5 maintains its locked state to restrict the rotation of the handle 3. Consequently, the manual valve 1 in the present embodiment can be provided with the lock mechanism 5 but designed small in valve size.

Further, in the manual valve 1 in the present embodiment, the lock hole 516 at a location in the second plate portion 512 such that the lock hole 516 does not overlap the valve body 2 when the movable member 51 is disposed in the locking position, whereas the lock hole 516 overlaps the valve body 2 when the movable member 51 is disposed in a position other than the locking position.

According to the manual valve 1 configured as above, while the handle 3 is not placed in the fully-closed position, it is possible to avoid the lock 7 from being attached to the lock mechanism 5 to lock the handle 3.

In the manual valve 1 in the present embodiment, the valve body 2 includes the first mounting hole 23A and the second mounting hole 23B used to attach the manual valve 1 to another member. The support rod 52 is attached to the valve body 2 by insertion through the first mounting hole 23A.

The manual valve 1 configured as above enables attachment of the lock mechanism 5 by use of the existing first mounting hole 23A. This facilitates retrofitting of the lock mechanism 5 to the manual valve 1. In the manual valve 1, the first mounting hole 23A and the second mounting hole 23B are located symmetric relative to the handle 3. The manual valve 1 may be configured such that the lock mechanism 5 is attached to the valve body 2 in such a way that the support rod 52 is inserted through the second mounting hole 23B to pivotally support the movable member 51.

(Usage Example of the Manual Valve)

Figure 10:
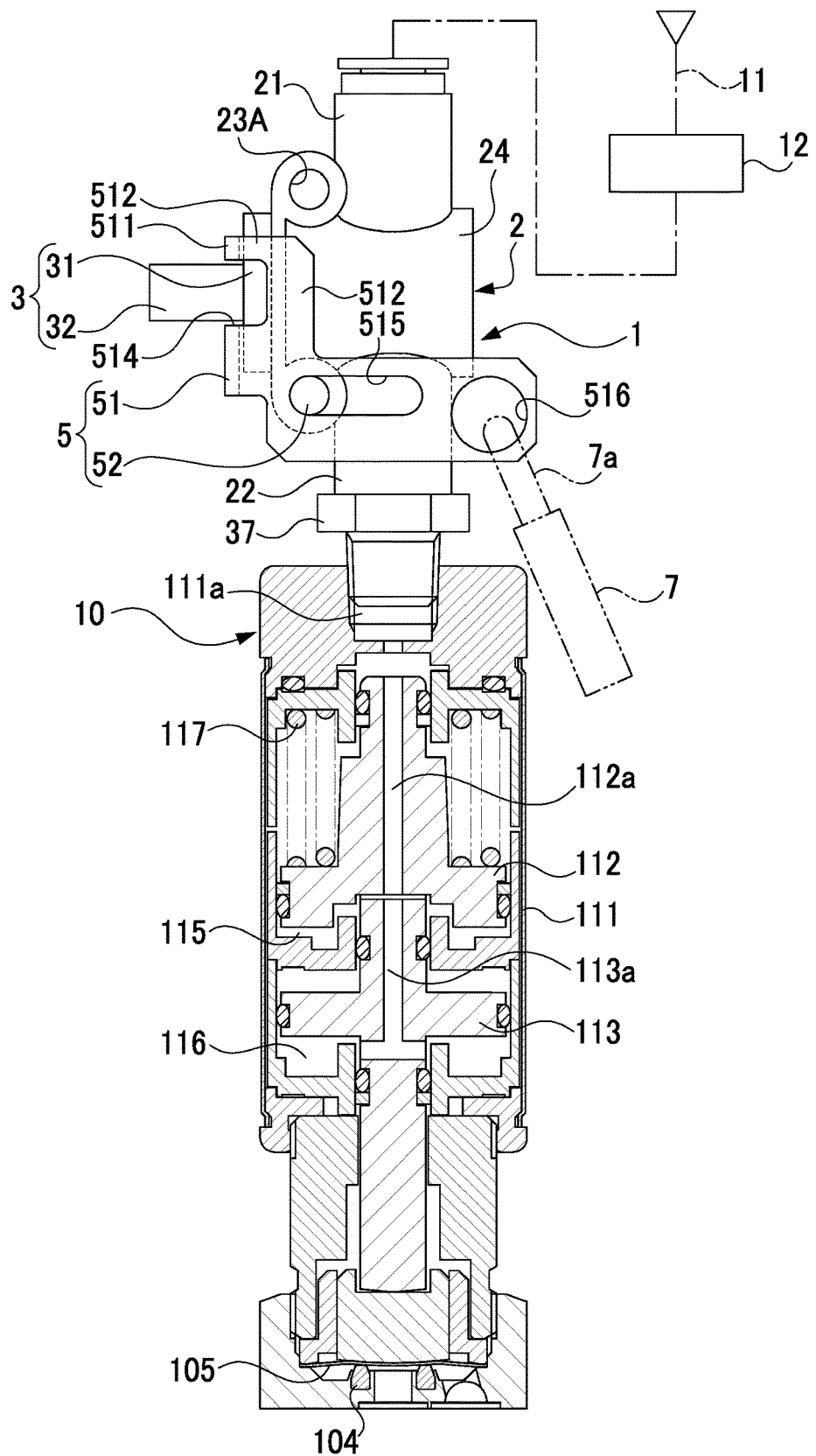
FIG. 10 is a partly sectional view of an air-operated valve in which the lock mechanism is located in the locking position.
Figure 11:
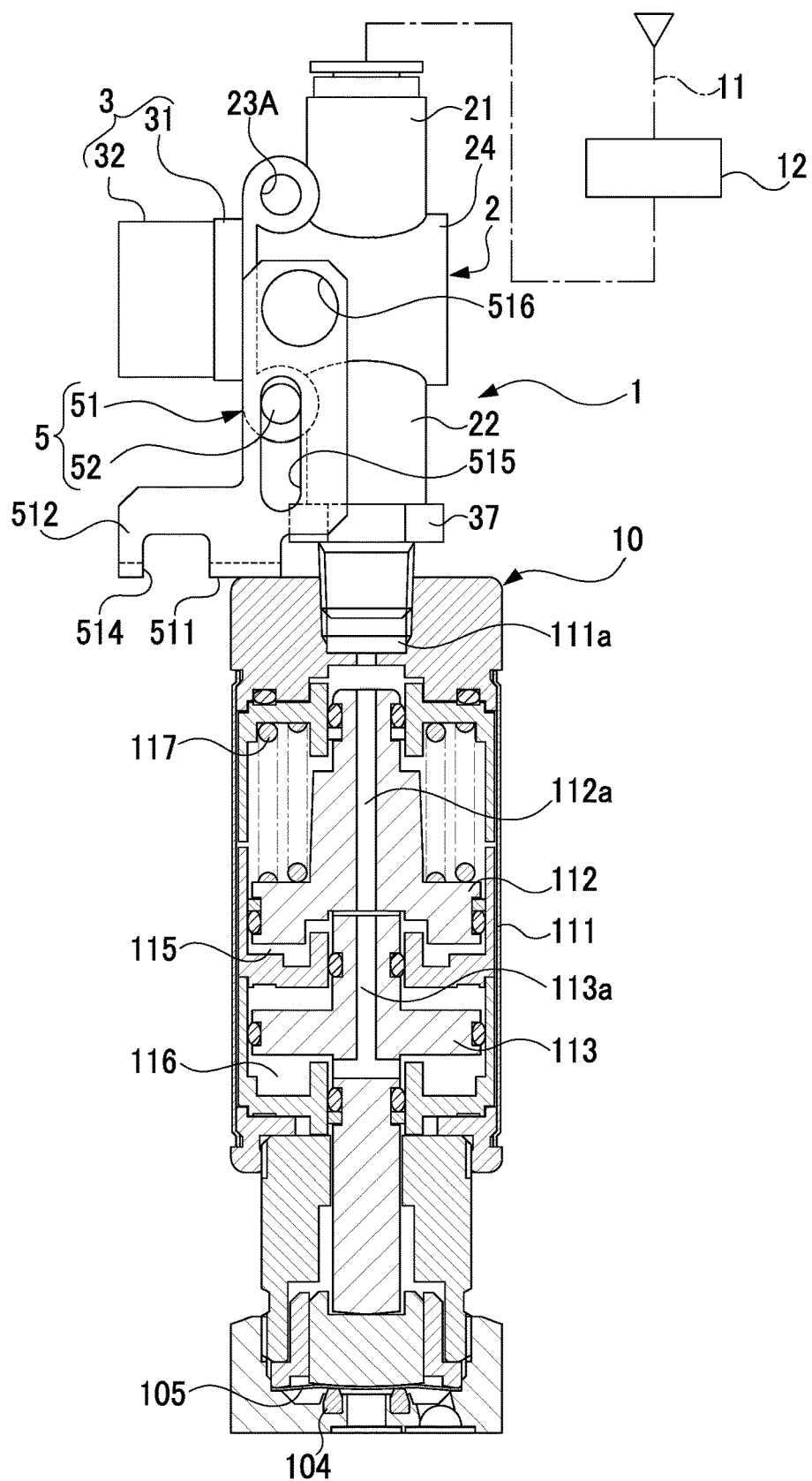
FIG. 11 is a partly sectional view of the air-operated valve in which the lock mechanism is located in the holding position.

FIG. 10 is a partly sectional view of an air-operated valve 10 in which the lock mechanism 5 is located in the locking position. FIG. 11 is a partly sectional view of the air-operated valve 10 in which the lock mechanism 5 is located in the holding position. The manual valve 1 is placed for example on a pipe 11 connecting an electromagnetic valve 12 and the air-operated valve 10. The electromagnetic valve 12 is one example of a control valve. The manual valve 1 is integrally attached to the air-operated valve 10. This air-operated valve 10 is one example of a pneumatic device. The pneumatic device is not limited to the air-operated valve but may be another device, such as an air cylinder device which operates by moving a rod back and forth.

In the air-operated valve 10, a first piston 112 and a second piston 113 placed in a cylinder 111 is moved up and down in FIGS. 10 and 11 according to the balance between the spring force of a compression spring 117 and the air pressure of operation air supplied to a first pressure chamber 115 and a second pressure chamber 116 through an operation port 111a and further an inner flow passage 112a of the first piston 112 and an inner flow passage 113a of the second piston 113. The movements of the pistons 112 and 113 cause a valve element 105 to contact with or separate from a valve seat 104.

The outlet part 22 of the manual valve 1 is coupled to the operation port 111a through a joint 37. The inlet part 21 of the manual valve 1 is coupled to the electromagnetic valve 12. In the manual valve 1, the movable member 51 is pivotally supported by the support rod 52 inserted through the second mounting hole 23B and is attached to the valve body 2.

In the manual valve 1, the handle 3 is placed in the fully-open position as shown in FIG. 11. Thus, the air-operated valve 10 performs an opening/closing operation according the the air pressure controlled by the electromagnetic valve 12.

When the air-operated valve 10 is to be subjected to maintenance, the handle 3 of the manual valve 1 is turned to the fully-closed position as shown in FIG. 10. This prevents the air-operated valve 10 from being erroneously operated during maintenance. At that time, since the mating hole 514 of the movable member 51 is engaged with the knob 32 of the handle 3 and further the lock 7 is attached to the lock hole 516 of the movable member 51, the lock mechanism 5 prevents the handle 3 from rotating from the fully-closed position to the fully-open position, thereby preventing the manual valve 1 from being erroneously opened during the maintenance.

After completion of the maintenance, the lock 7 is detached from the movable member 51 of the lock mechanism 5. The movable member 51 is slid leftward in FIG. 10 and then rotated counterclockwise to the holding position shown in FIG. 11. When the handle 3 of the manual valve 1 is turned from the fully-closed position to the fully-open position, the air-operated valve 10 operates to open and close the valve element 105 with respect to the valve seat 104 by the air pressure controlled by the electromagnetic valve 12.

Herein, the holding position shown in FIG. 11 is adjusted within the range of the guide hole 515 so that the first plate portion 511 of the movable member 51 abuts against the upper surface of the cylinder 11 in FIG. 11. Thus, even when the air-operated valve 10 vibrates during operation, the movable member 51 is less likely to wobble and hence interfering sound, or hitting noise, generated between the movable member 51 and the cylinder 111 is reduced.

Since the lock hole 516 of the movable member 51 overlaps the valve body 2 of the manual valve 1, the manual valve 1 of the air-operated valve 10 in such a fully open state makes it impossible to attach the lock 7 to the lock mechanism 5.

The air-operated valve 10 in the present embodiment described above is integrally provided with the manual valve 1, so that the pipe 11 for connecting the electromagnetic valve 12 and the air-operated valve 10 can be shortened. The small manual valve 1 which can be integrally combined with the air-operated valve 10 includes the lock mechanism 5 in compact form. Thus, even if the space between the electromagnetic valve 12 and the air-operated valve 10 is narrow, the manual valve 1 with the lock mechanism 5 can be placed.

The foregoing embodiments are mere examples and give no limitation to the present disclosure. The present disclosure may be embodied in other specific forms without departing from the essential characteristics thereof.

For instance, the shape of the handle 3 and the shape of the mating hole 514 are not limited to the above shapes. As an alternative, the handle 3 may be designed to have a columnar shape including a cut face in the outer periphery to have a knob 32 of a D shape in planar view. In this case, the mating hole 514 may be designed to have a D-shape to match the shape of the knob 32 of the handle 3 placed in the fully-closed position. As another example, the knob 32 may be polygonal, such as triangular and pentagonal, in planar view. In this case, the mating hole 514 may be designed to have a shape conformable with the shape of the knob 32 when the handle 3 is placed in the fully-closed position.

As another example, the lock mechanism 5 may configured such that the first plate portion 511 includes a cover part, instead of the mating hole 514. This cover part has a protruding shape that matches the shape of the knob 32 of the handle 3 placed in the fully-closed position to cover the knob 32 when the lock mechanism 5 is in the locking position. However, the mating hole 514 is more preferable because the movable member 51 with the mating hole 514 is simple in shape, enabling reduction in machining cost or material cost.

The shape of the movable member 51 is not limited to the L-shape in the foregoing example. As another example, the movable member 51 may be designed such that a pair of second plate portions 512 are provided on both sides of the first plate portion 511 to have an angular U-shape. In this case, the second plate portions 512 are each provided with a guide hole 515 so that a single support rod 52 is inserted through the guide holes 515. The lock hole 516 may be provided in each of the second plate portions 512 or in only one of them.

The predetermined position of the handle 3 in restricting the rotation of the handle 3 is not limited to the fully-closed position and alternatively may be the fully-open position. In this case, the mating hole 514 may be designed to have a rectangular shape, sideways long to match the shape of the knob 32 of the handle 3 placed in the fully-open position.

The inlet part 21 and the outlet part 22 are not limited to the positions in the foregoing embodiments. As another example, the inlet part 21 and the outlet part 22 may be provided in positions different in phase by 90° along the circumference of the valve body 24 or in positions different in the height direction of the valve body 24. In another example, it may be arranged such that the inlet part 21 is provided on the outer periphery of the valve body 24 and the outlet part 22 is be provided on the lower surface of the valve body 24 located opposite the handle 3.

REFERENCE SIGNS LIST

1 Manual valve
2 Valve body
3 Handle
5 Lock mechanism
7 Lock
10 Air-operated valve
51 Movable member
52 Support rod
511 First plate portion
512 Second plate portion
514 Mating hole
515 Guide hole
516 Lock hole

What is claimed is:
1. A manual valve comprising:
a valve body;
a handle rotatably attached to the valve body; and
a lock mechanism configured to allow attachment of a lock to restrict the handle from rotating from a predetermined position, the lock mechanism including:
  a movable member having a bent-plate shape and including a first plate portion and a second plate portion continuous with the first plate portion; and
  a support rod attached to the valve body to pivotally support the movable member, wherein:
the first plate portion includes an engagement part configured to engage with the handle to restrict rotation of the handle when the handle is placed in the predetermined position, and the engagement part is configured not to engage the handle to permit the rotation of the handle when the handle is placed in a position other than the predetermined position,
the second plate portion includes:
  a guide hole through which the support rod is slidably inserted, the guide hole extending straight to guide the movable member between a locking position, in which the engagement part is in engagement with the handle, and an unlocking position, in which the engagement part is out of engagement with the handle; and
  a lock hole configured to be attached to the lock,
the movable member is configured to slide along the guide hole from the locking position to the unlocking position and then rotate about the support rod from the unlocking position to a holding position at which the movable member is held, which is adjusted within a range of the guide hole, and
the handle is prevented from rotating when the movable member is placed in the locking position, and the handle is permitted to rotate when the movable member is placed in the unlocking position and the holding position.

2. The manual valve according to claim 1, wherein the lock hole is provided at a location in the second plate portion such that the lock hole does not overlap the valve body when the movable member is placed in the locking position, and the lock hole overlaps the valve body when the movable member is placed in the unlocking position or the holding position.

3. The manual valve according to claim 2, wherein:
the manual valve is configured to be placed between a pneumatic device, which is operated by air pressure, and a control valve configured to control the air pressure to be supplied to the pneumatic device, and
the predetermined position is a fully-closed position in which the manual valve is fully closed.

4. The manual valve according to claim 1, wherein:
the valve body includes a mounting hole configured to attach the manual valve to another member, and
the support rod is attached to the valve body by insertion through the mounting hole.

5. The manual valve according to claim 4, wherein:
the manual valve is configured to be placed between a pneumatic device, which is operated by air pressure, and a control valve configured to control the air pressure to be supplied to the pneumatic device, and
the predetermined position is a fully-closed position in which the manual valve is fully closed.

6. The manual valve according to claim 2, wherein:
the valve body includes a mounting hole configured to attach the manual valve to another member, and
the support rod is attached to the valve body by insertion through the mounting hole.

7. The manual valve according to claim 6, wherein:
the manual valve is configured to be placed between a pneumatic device, which is operated by air pressure, and a control valve configured to control the air pressure to be supplied to the pneumatic device, and
the predetermined position is a fully-closed position in which the manual valve is fully closed.

8. The manual valve according to claim 1, wherein:
the manual valve is configured to be placed between a pneumatic device, which is operated by air pressure, and a control valve configured to control the air pressure to be supplied to the pneumatic device, and
the predetermined position is a fully-closed position in which the manual valve is fully closed.

9. A pneumatic device configured to be operated by air pressure, wherein the pneumatic device is integrally attached with the manual valve set forth in claim 1.

10. The pneumatic device according to claim 9, wherein:
the manual valve is configured to be placed between the pneumatic device and a control valve configured to control the air pressure to be supplied to the pneumatic device, and
the predetermined position is a fully-closed position in which the manual valve is fully closed.

11. A pneumatic device configured to be operated by air pressure, wherein the pneumatic device is integrally attached with the manual valve set forth in claim 2.

12. The pneumatic device according to claim 11, wherein:
the manual valve is configured to be placed between the pneumatic device and a control valve configured to control the air pressure to be supplied to the pneumatic device, and
the predetermined position is a fully-closed position in which the manual valve is fully closed.

13. A pneumatic device configured to be operated by air pressure, wherein the pneumatic device is integrally attached with the manual valve set forth in claim 4.

14. The pneumatic device according to claim 13, wherein:
the manual valve is configured to be placed between the pneumatic device and a control valve configured to control the air pressure to be supplied to the pneumatic device, and
the predetermined position is a fully-closed position in which the manual valve is fully closed.

15. A pneumatic device configured to be operated by air pressure, wherein the pneumatic device is integrally attached with the manual valve set forth in claim 6.

16. The pneumatic device according to claim 15, wherein:
the manual valve is configured to be placed between the pneumatic device and a control valve configured to control the air pressure to be supplied to the pneumatic device, and
the predetermined position is a fully-closed position in which the manual valve is fully closed.

* * * * *